(12) United States Patent
Radier et al.

(10) Patent No.: US 8,516,109 B2
(45) Date of Patent: Aug. 20, 2013

(54) METHOD FOR OBTAINING INFORMATION RELATING TO A LOCAL ENVIRONMENT OF A TERMINAL

(75) Inventors: Benoît Radier, Perros Guirec (FR);
Anne Marrec, Pleumeur-Bodou (FR);
Mikaël Salaun, Rosnoen (FR)

(73) Assignee: France Telecom, Paris (FR)

( * ) Notice: Subject to any disclaimer, the term of this patent is extended or adjusted under 35 U.S.C. 154(b) by 234 days.

(21) Appl. No.: 13/056,514

(22) PCT Filed: Jul. 17, 2009

(86) PCT No.: PCT/FR2009/051432
§ 371 (c)(1),
(2), (4) Date: Jan. 28, 2011

(87) PCT Pub. No.: WO2010/012934
PCT Pub. Date: Feb. 4, 2010

(65) Prior Publication Data
US 2011/0196962 A1     Aug. 11, 2011

(30) Foreign Application Priority Data
Jul. 28, 2008 (FR) ...................................... 08 55170

(51) Int. Cl.
*H04L 29/08* (2006.01)
(52) U.S. Cl.
USPC .............................. 709/224; 726/13; 707/706

(58) Field of Classification Search
USPC ................. 709/217, 218, 220, 222, 224, 227; 370/254, 301
See application file for complete search history.

(56) References Cited

U.S. PATENT DOCUMENTS
2007/0011268 A1* 1/2007 Banga et al. .................. 709/217

FOREIGN PATENT DOCUMENTS
EP         1 881 639         1/2008

OTHER PUBLICATIONS

"Telecommunications and Internet converged Services and Protocols for Advanced Networking (TISPAN); NGN Functional Architecture; Network Attachment Sub-System (NASS); ETSI ES 282 004", vol. TISPAN, No. V2.0.0, XP014041575, Feb. 1, 2008.
"Telecommunications and Internet converged Services and Protocols for Advanced Networking (TISPAN); Customer Devices architecture and Reference Points; ETSI TS 185 006", ETSI Standards, vol. TISPAN, No. V2.0.0, XP014041848, Mar. 1, 2008.

* cited by examiner

*Primary Examiner* — Kambiz Zand
*Assistant Examiner* — Noura Zoubair
(74) *Attorney, Agent, or Firm* — Knobbe Martens Olson & Bear LLP

(57) ABSTRACT

Obtaining information relating to a local environment of a terminal of a local network and to providing the terminal, via an application server, with at least one service adapted both as a function of the information relating to an access session of the terminal and the information relating to a local environment of the terminal. The local environment information of the terminal is obtained from an autoconfiguration server via a session server and it is provided to the application server.

11 Claims, 4 Drawing Sheets

METHOD FOR OBTAINING INFORMATION RELATING TO A LOCAL ENVIRONMENT OF A TERMINAL

RELATED APPLICATIONS

This is a U.S. National Phase Application under 35 USC §371 of International Application PCT/FR2009/051432, filed on Jul. 17, 2009.

This application claims the priority of French application Ser. No. 08/55170 filed on Jul. 28, 2008, the content of which is hereby incorporated by reference.

BACKGROUND OF THE INVENTION

The present invention relates to a method of obtaining from an access network (for example a Wide Area Network (WAN)) information relating to a local environment of a terminal of a local network (for example a Local Area Network (LAN)).

The invention finds a preferred application in the field of the provision of personalized services, in particular to enable telecommunications carriers and/or service providers to provide a terminal with services adapted to suit its local environment as a function of environment information relating to the local network of the terminal.

The terminal accesses a service via a customer line of an access network of the PSTN (Public Switched Telephone Network) type, access to the network being effected via NAS (Network Access Server) or BAS (Broadband Access Server) type equipment.

The terminal is monitored by and obtains an IP (Internet Protocol) address from the access network carrier. To this end, the terminal is identified to an access session server.

In the context of the invention, the expression network access session server (CLF: Connectivity Session Location and Repository Function) refers to a server for collecting information about user sessions at the access network level. In a manner known in the art, the session server stores an IP address of a terminal in association with corresponding information relating to the geographical location of the network, access characteristics (uplink bit rate, downlink bit rate, physical characteristics of the line), the name of the access provider.

Moreover, the terminal is configured in the local network by an autoconfiguration server of the access network.

In the context of the invention, the expression AutoConfiguration Server (ACS), Customer Network Gateway Configuration Function (CNGCF), or Customer Premises Equipment Configuration Function (CPECF) refers to a server enabling a terminal to have its parameters set and to be configured automatically so that it is able to access services of a service provider to which the customer subscribes as a function of the customer's rights of access to services and of the type of terminal. Consequently, the autoconfiguration server holds all the customer's rights of access to services and the various parameters making it possible to configure the various types of terminal of those customers. The autoconfiguration server is able to recover terminal status modifications and information relating to the configurations of the terminals.

The service is provided to the terminal by an application server (AF: Application Function).

At present there is no simple and reliable method of obtaining from the access network local environment information relating to a terminal of a local or home network. Below the expression "local environment" information refers to environment information in the local or home network.

A fortiori, such a method is not used to provide a service adapted to suit a terminal in a local or home network as a function of local environment information obtained from the access network.

OBJECT AND SUMMARY OF THE INVENTION

One object of the present invention is directed to a method used by an access session server to obtain information relating to a terminal of a local network, said access session server being adapted to provide information relating to an access session of the terminal to an access network;
    said information-obtaining method being characterized in that it includes, on reception of an information request relating to the terminal from an application server, obtaining from an autoconfiguration server information relating to a local environment of said terminal and providing said information to the application server.

Another aspect of the present invention is directed to a method of providing service to a terminal of a local network, comprising:
    an application server sending an information request relating to a terminal to an access session server;
    said access session server obtaining and providing to said application server information relating to an access session of the terminal to an access network;
    said access session server obtaining and providing to said application server said information relating to a local environment of the terminal by using a method as described above; and
    said application server providing to said terminal at least one service adapted as a function of the information relating to an access session of the terminal and the information relating to a local environment of the terminal.

The service provision method of the invention is advantageously used to recover simultaneously session information and local environment information and to provide a service adapted to suit each terminal as a function of this information.

In the conventional way, a terminal in the local network communicates with the servers of the access network via a gateway, which may be a home gateway in the situation of a home local network. If the gateway is a router modem, the terminal is concealed behind the gateway. If the gateway is a bridge modem, the terminal is directly visible from the access network.

Firstly, the fact that the local environment information is obtained from the autoconfiguration server makes it possible to guarantee the veracity of this information and to maintain a high level of confidence of a third-party entity such as an application server. The veracity of this information is guaranteed in that it is maintained at the level of the autoconfiguration server, which is under the control of a carrier or a service provider. This avoids a terminal itself providing a third-party entity with its own local environment information, which it might have falsified. Thus it is possible to prevent fraudulent use of this information.

In contrast, obtaining local environment information via the access session server is simple to implement in that it does not use any additional communications interface over and above what exists at present.

According to one feature of the present invention, the access session server provides said information relating to a local environment of the terminal plus said information relating to an access session of the terminal.

Thus the session server obtains session information and local environment information simultaneously using the existing communications interfaces. This information makes it possible to characterize the environment of the terminal more precisely.

According to another feature of the present invention, before providing to the access session server the information relating to a local environment, the autoconfiguration server selects as a function of the adapted service to be provided the information relating to a local environment of the terminal to be provided to the access sessions manager.

Selection of the pertinent information at the autoconfiguration server level makes it possible to optimize bandwidth use by limiting the quantity of information in transit across the access network.

According to a further feature of the present invention, the information relating to a local environment of the terminal includes information relating to access points to the access network adjoining the terminal and the service provision method includes selecting an access point from said access points as a function of the adapted service to be provided.

This is particularly advantageous for determining a suitable access point in the context of managing a handover service.

Another aspect of the present invention is directed to a method used by an autoconfiguration server, the method being characterized in that it includes:

reception by said autoconfiguration server from an access session server of an interrogation request to obtain information relating to a local environment of a terminal of a local network; and provision of said information by said autoconfiguration server to said access session server in response to said request.

According to one feature of the present invention, the method used by the autoconfiguration server further includes selection by said autoconfiguration server of the information relating to a local environment of the terminal to be provided to the access session server as a function of a service to be provided to the terminal by an application server.

According to another feature, the information relating to a local environment of the terminal includes information relating to access points to the access network adjoining the terminal and the method used by the autoconfiguration server includes selecting an access point from said access points as a function of the adapted service to be provided.

According to one feature of the present invention, the method of obtaining information further includes the access session server sending the application server said information relating to an access session of the terminal plus the information relating to a local environment of the terminal.

The present invention further provides an autoconfiguration server including means for obtaining information relating to a local environment of a terminal. The autoconfiguration server of the invention further includes means for receiving an interrogation request from an access session server and means for providing said information relating to a local environment of the terminal to said access session server in response to said interrogation request.

Thus the autoconfiguration server of the present invention is adapted to provide a third-party entity with environment information relating to a local environment of the terminal of a local network. The veracity of the information is advantageously guaranteed by the carrier or the service provider that operates the autoconfiguration server.

According to one feature of the present invention, the autoconfiguration server further includes means for selecting as a function of the service to be provided the information to be provided to the access session server relating to a local environment of the terminal.

The present invention further provides an access session server adapted to provide information relating to an access session to an access network of a terminal of a local network, the server being characterized in that it includes means adapted, on reception of a request from an application server for information relating to the terminal, to obtain by interrogating an autoconfiguration server information relating to a local environment of the terminal and to provide that information to said application server.

The access session server advantageously obtains access to the local environment information from the autoconfiguration server in a simple and reliable manner using existing communications interfaces.

According to one feature of the present invention, the access session server further includes means for sending the application server information relating to an access session plus the environment information relating to a local environment of the terminal.

Another aspect of the invention is directed to a system including a terminal of a local network, an autoconfiguration server, and an access session server as described above, and an application server adapted to provide services to said terminal, said application server including:

means for sending said access session server a request for information relating to a terminal; and means for providing to said terminal at least one service adapted as a function of information relating to an access session of the terminal and information relating to a local environment of the terminal.

Thus the application server obtains the session information and the local environment information simultaneously and in a simple and guaranteed manner. This information enables the application server to personalize the proposed service taking account not only of the access network but also of the local network.

The fact that the application server obtains the local environment information from the autoconfiguration server makes it possible to guarantee the veracity of this information in that it is maintained at the level of the autoconfiguration server, which is under the control of a carrier or a service provider. This avoids a terminal providing its own local environment information, which it might have falsified, directly to the application server.

Moreover, obtaining environment information via the access session server is simple to implement in that it allows the use of existing communications interfaces.

Another aspect of the present invention is related to a computer program including instructions for executing the steps of the method used by an autoconfiguration server of the invention as described above when said program is executed by a computer.

Another aspect of the present invention is related to a computer program including instructions for executing the steps of the method enabling an access session server to obtain information relating to a terminal as described above when said program is executed by a computer.

Each of the computer programs referred to above may use any programming language and take the form of source code, object code, or a code intermediate between source code and object code, such as a partially-compiled form, or any other desirable form.

Another aspect of the present invention is related to a computer-readable information medium storing instructions of a computer program as referred to above.

The information medium may be any entity or device capable of storing the program. For example, the medium may include storage means, such as a read only memory (ROM), for example a compact disk ROM (CD ROM) or a microelectronic circuit ROM, or magnetic storage means, for example a floppy disk or a hard disk.

In contrast, the information medium may be a transmissible medium such as an electrical or optical signal, which may be routed via an electrical or optical cable, by radio or by other means. The program of the invention may in particular be downloaded over an Internet-type network.

Alternatively, the information medium may be an integrated circuit incorporating the program, the circuit being adapted to execute the method in question or to be used in its execution.

BRIEF DESCRIPTION OF THE DRAWINGS

Other features and advantages of the present invention emerge from the description given below with reference to the appended drawings, which show one non-limiting implementation of the present invention. In the drawings.

DETAILED DESCRIPTION OF ONE IMPLEMENTATION

One implementation of the present invention is described in detail below with reference to FIGS. 1 and 2, in the context of providing a personalized service from an access network 4 to a user of equipment in a home network 2 (local network).

Figure 1:
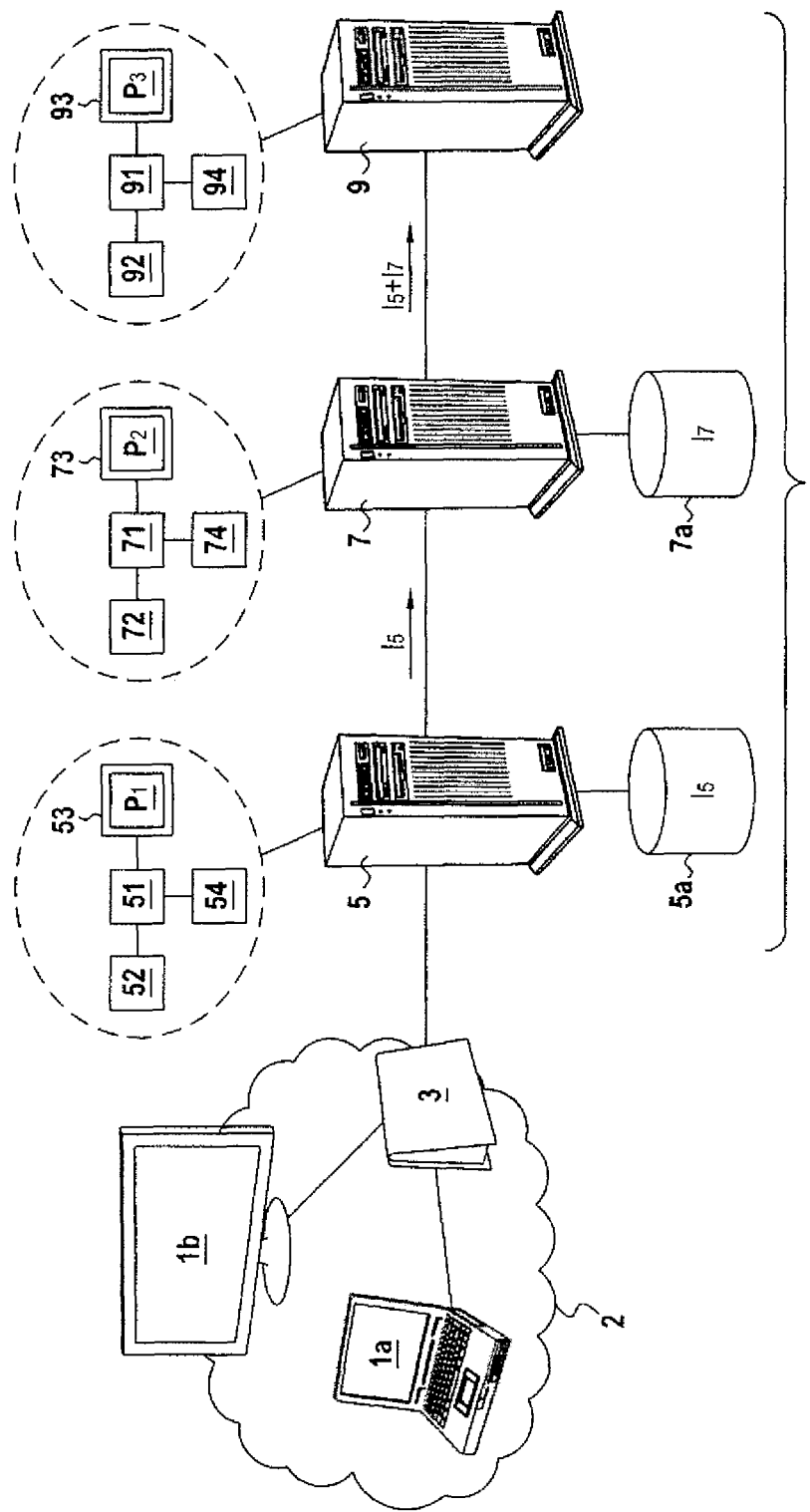
FIG. 1 shows a system of one embodiment of the present invention diagrammatically and in the context of providing a personalized service.

As shown in FIG. 1, the home network 2 includes a terminal (laptop computer) 1a and a high-definition screen 1b. Each of these pieces of equipment 1a, 1b is connected to a home gateway 3 (CNG: Customer Network Gateway) that is the central point of the home network.

As shown in FIG. 1, the access network 4 includes:
an autoconfiguration server 5 associated with a database 5a holding information $I_5$ relating to the home network 2 of the terminal 1a;
an access session server 7 for the access network 4 associated with a database 7a holding session information $I_7$ relating to an access session of the terminal 1a to the access network 4; and
an application server 9 able to provide to the terminal in the home network 2 a service adapted as a function of information received from the access session server 7.

A communications interface is provided between the autoconfiguration server 5 and the session server 7, in particular to make it possible for the session server 7 to obtain the information $I_5$ relating to the home network 2 from the autoconfiguration server 5 by the method of the present invention.

The steps of the method of providing a personalized service as a function of the local environment information $I_5$ and the session information $I_7$ is described in detail below with reference to FIG. 2.

During a preliminary configuration phase $P_0$ the autoconfiguration server 5 configures the equipment 1a, 3 of the home network 2. In particular, the home gateway 3 is configured by the autoconfiguration server 5 (step $E_0$) and identified by the access session server 7 (step $E'_0$).

The protocol enabling the autoconfiguration server 5 to configure the equipment of the home network 2 is preferably the TR-069 protocol (CPE WAN Management Protocol). The TR-104 protocol (Provisioning Parameters for VoIP CPE) may be used to configure equipment using the VoIP (Voice over IP) technology.

The configuration parameters used to configure each piece of equipment in the home network 2 are stored in a database 5a managed by the autoconfiguration server 5 and constitute information $I_5$ relating to a local environment of the user, in the sense relevant to the present invention.

For example, this information consists of:
the type(s) of access available on the home network 2: WiFi™ (IEEE 802.11 b, g, n) or Ethernet (IEEE 802.3);
the types of equipment (home gateway 3, computer 1a) present in the home network 2 and configured by the autoconfiguration server 5; and
the available pieces of equipment present in the local network but requiring no particular configuration (TV screen 1b, loudspeakers, microphone, computer screen).

For example, the configuration parameters of each piece of equipment 3, 1a of the home network 2 and relating to each communications interface (USB, Ethernet, WiFi) are stored in the database 5a in the following form:
Software/firmware image management for each piece of equipment;
Status and performance monitoring; and
Diagnostics.

The data is stored in the form of an object. For example, the object InternetGatewayDevice.LANDevice.{i}, WLANConfiguration.{i} contains the following information:
Enable; Status; BSSID; SSID; MaxBitRate; Channel; BeaconType; MACAddressControlEnabled; Standard; WEPKeyIndex; KeyPassphrase; WEPEncryptionLevel; BasicEncryptionModes; BasicAuthenticationMode; WPAEncryptionModes; WPAAuthenticationMode; IEEE11iEncryptionModes; IEEE11iAuthenticationMode; PossibleChannels; BasicDataTransmitRates; OperationalDataTransmitRates; PossibleDataTransmitRates; InsecureOOBAccessEnabled; BeaconAdvertisementEnabled; RadioEnabled; AutoRateFallBackEnabled; LocationDescription; RegulatoryDomain; TotalPSKFailures; TotalIntegrityFailures; ChannelsInUse; DeviceOperationMode; DistanceFromRoot; PeerBSSID; AuthenticationServiceMode; TotalBytesSent; TotalBytesReceived; TotalPacketsSent; TotalPacketsReceived; TotalAssociations.

The session information $I_7$ is stored in the database 7a managed by the session server 7 so that the validity of this information is guaranteed by the carrier of the access network 4 that controls the session server 7.

In a manner that is known in the art, the session information $I_7$ is used to identify the access point to the access network 4 and to construct a configuration suited to the environment of the user of the terminal 1a.

The session information $I_7$ includes, for example:
the customer identifier associated with an access line (Subscriber ID);
the access line or logical access identifier;
the access network type (ATM, Ethernet, WiFi, xDSL, FTTH);

the terminal type (voice, video, PC); and the public IP address (IP Edge Identity) used by the home gateway 3 or the public address used by the user terminals of the home network 2.

The session information $I_7$ may contain further information such as the geographical location of the home network 2 (Physical Access ID; Address Realm), the physical access type (ADSL: Asynchronous Digital Subscriber Line, FTTH: Fiber To The Home), and the bit rate (uplink, downlink) of the physical line used by the terminal 1a/home gateway 3.

As soon as the configuration of a piece of equipment of the home network 2 is modified by an administrator of the equipment or by updating the software layer by the access network, the modifications are sent automatically to the autoconfiguration server 5 using the TR-069 and/or TR-104 protocol.

It is assumed that a user of the terminal 1a requires access to a video stream service adapted to suit their environment. For example, this service enables the user to view an HD (High Definition) video stream on an appropriate terminal or peripheral of the home network 2.

To this end, during a sending step $E_1$, the terminal 1a sends the application server 9 a service request $R_1$. The service request $R_1$ contains the IP address (@1) of the terminal 1a, making it possible to identify it.

Figure 2:
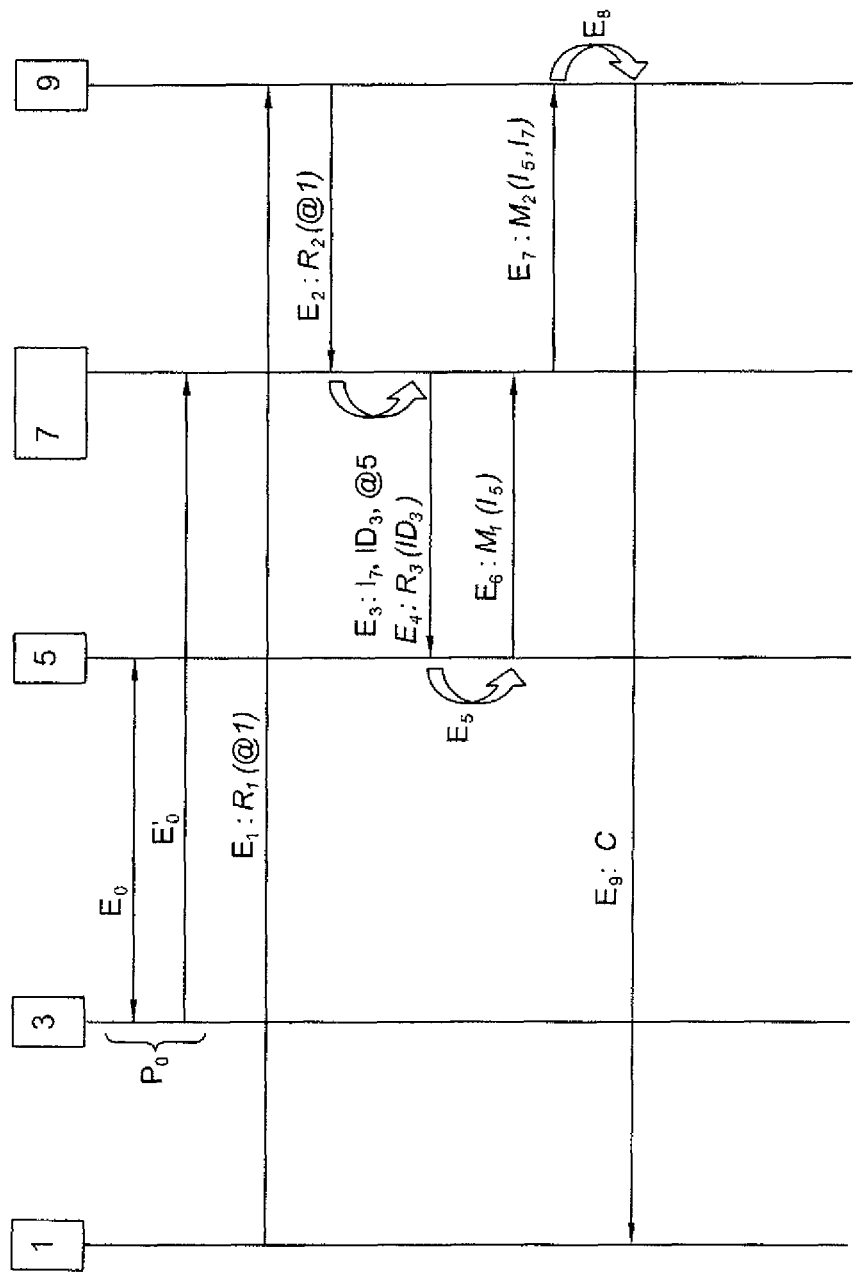
FIG. 2 shows in flowchart form the steps of the method of one implementation of the present invention used in the context of providing a personalized service.

In the implementation shown in FIG. 2, the home gateway 3 incorporates the functions of a bridge modem. A bridge modem has the feature of allowing all requests to enter the access network 4 without modifying them. In the present situation, the pieces of equipment of the home network 2 are directly visible from the access network 4.

In another implementation, not shown, the home gateway 3 incorporates the functions of a router modem. Using a router modem means that the access network 4 has no knowledge about the equipment connected to the home network 2. In this situation, only the autoconfiguration server 5 knows what equipment is connected to the home network 2. In this implementation, on reception of the service request $R_1$, the home gateway 3 substitutes in the service request its own public IP address (@3) for the IP address (@1) of the terminal 1a for communicating with the application server 9.

On reception of the service request $R_1$, the application server 9 sends the session server 7 an information request $R_2$ including the IP address (@1) of the terminal 1a that is the source of the service request (or the IP address (@3) of the home gateway 3 if it has substituted its own address for that of the terminal in the service request $R_1$).

According to the present invention, this information request $R_2$ makes it possible for the application server 9 to obtain environment information $I_5$ relating to the home network 2 of the terminal 1a. This request $R_2$ also makes it possible to obtain at the same time session information $I_7$ relating to the access session of the terminal 1a to the access network 4.

On reception of the information request $R_2$, the session server 7 obtains, during a step $E_3$, the session information $I_7$ relating to the access session associated with the address @1 of the terminal 1a (or the address @3 of the home gateway 3). This session information $I_7$ is extracted from the database 7a associated with the session server 7. Thus the information $I_7$ relating to an access session of the terminal is obtained by interrogating the access session server 7.

During this same step $E_3$, the access session server 7 obtains the IP address (@5) of the autoconfiguration server 5 that configured the terminal 1a in the home network 2 and the identifier $ID_3$ of the home gateway 3 of the terminal 1a.

From the public address of the home network 2, the session server 7 knows the identifier $ID_3$ of the home gateway 3 and the address @5 of the autoconfiguration server 5. This data is stored in a related manner in the access session server 7.

If the home gateway is a bridge modem, the access session server 7 needs the public IP address @1 of the terminal 1a to obtain the address @5 of the autoconfiguration server and the identifier $ID_3$ of the home gateway 3. Since the home gateway 3 is connected to the same line as the terminal 1a, it suffices to recover the IP address of a home gateway type equipment connected to the same line as the terminal 1a. The access session server 7 knows all the equipment types connected to a line as soon as it obtains a public address. The access session server 7 makes it possible to find the geographical location of the network of a terminal.

If the home gateway is a router modem, during the home gateway search procedure the access session server 7 returns the public IP address @3 of the gateway 3 identical to that included in the service request $R_1$.

The address @5 makes it possible to interrogate the autoconfiguration server 5 to recover local environment information. During assignment of public IP addresses to the equipment, of the access network, the address @5 is stored in the access session server 7 in association with a public IP address of each terminal (terminal or gateway, according to whether it acts as a bridge modem or a router modem). The access session server 7 stores pairs of addresses (public @IP, @5) enabling each piece of equipment (terminal or gateway) to determine the autoconfiguration server 5 to which it is connected. The public IP address is that of the terminal if the gateway is transparent or that of the gateway if the terminal is not visible from the access network.

According to the present invention, the session server 7 adds to the session information $I_7$ environment information $I_5$ relating to the local network that it obtains from the autoconfiguration server 5 responsible for configuring the local network 2 as described above.

To this end, during a step $E_4$, the session server 7 sends the autoconfiguration server 5 at the IP address (@5) of the autoconfiguration server 5 an information request $R_3$ containing the identifier $ID_3$ of the home gateway 3 determined during the preceding step $E_3$.

On reception of the information request $R_3$, the autoconfiguration server 5 extracts from the associated database 5a the environment information $I_5$ relating to the home network 2 (step $E_5$).

During this same step $E_5$, the autoconfiguration server 5 acts, as a function of the service to be provided, to select information relating to the local environment of the terminal for providing to the access session server 7.

As described above, the environment information $I_5$ relates to the configuration of the home network 2 and more particularly to the connection configuration of the home gateway 3 (type of access available, types of terminal connected and configured by the autoconfiguration server 5).

In a different implementation, not all the environment information $I_5$ relating to the home network 2 is stored in the database 5a. This is particularly advantageous if the total quantity of information to be stored is high because of the large number of customers to be managed. In this situation, the autoconfiguration server 5 obtains on the fly (in response to the information request $R_3$) local environment information specific to the home network 2 from the home gateway 3 and/or the equipment connected to the gateway 3. Such information may be obtained by the autoconfiguration server 5 using the following commands provided by the TR-069 protocol:

GetParameterValues obtains the value of a parameter;

GetParameterNames obtains the name of the parameters that the autoconfiguration server 5 is able to recover;

GetParameterAttributes obtains all the arguments of a parameter.

These methods then make it possible to recover the following information, mentioned below by way of example:

LANDeviceNumberOfEntries: the number of terminals (CND) connected to the home gateway 3 (CNG);

InternetGatewayDevice.LANDevice.{i}: the number of terminals connected to the home network LAN {i} of the home gateway 3 for the WLAN, Ethernet and USB technologies;

InternetGatewayDevice.LANDevice.{j}.LANEthernetInterfaceConfigure{i}: the characteristics of the interface {i} of the home network 2 (LAN) {j} with a terminal (CPE); the application server 9 can use such information to find out the type of connectivity used by a terminal and thus to verify that the terminal is connected to the home gateway 3 or that the access line of the network is not saturated; and InternetGatewayDevice.LANDevice.{i}.WLANConfiguration.{i}: the WiFi configuration of the home gateway 3 or of the terminals present in the home network 2; this information is advantageously used by the application server 9, for example in the context of handover management.

In a similar manner, the TR-104 protocol may be used in the context of VoIP service management to enable the autoconfiguration server 5 to obtain specific information from VoIP terminals, for example:

VoiceService.{i}.Capabilities: as a function of the capabilities of the home gateway 3, whether a voice call may be transferred to a videoconference (voice and picture) call;

VoiceService.{i}.Capabilities.SIP: whether a terminal is able to receive a VoIP call using the SIP (Session Initiation Protocol) and the telephone number associated with the IP address of the terminal; and VoiceService.{i}.Capabilities.Codecs.{i}: the codecs supported by a terminal and thus, for example, whether the terminal is able to receive a videoconference call.

During a sending step $E_6$, the autoconfiguration server 5 sends the session server 7 a message $M_1$ containing the local environment information $I_5$ previously obtained. For example, the message $M_1$ includes parameters relating to the various communications interfaces available at the level of the home gateway 3 of the home network 2.

On reception of the local environment information $I_5$ provided by the autoconfiguration server 5, the access session server 7 sends (step $E_7$) the application server 9 a message $M_2$ including the local environment information $I_5$ plus the terminal access session information $I_7$.

During an adaptation step $E_8$, the application server 9 adapts the service requested by the terminal as a function of the environment information $I_5$ relating to the local network 2 and the access session information $I_7$ relating to the current session. Thus the application server 9 may offer a user a service adapted to suit how they access the access network 4 and the home network 2.

During an activation step $E_9$, the application server 9 activates the service adapted as a function of these two types of information by sending a command C to the terminal 1a via the home gateway 3.

On reception of this command C, the user of the terminal may use the adapted service.

In the context of the service described above, the command C makes it possible, for example, to activate the screen 1b to receive a high-definition video stream, instead of receiving the same video stream on the laptop computer 1a, which is not suited to this service.

Other Implementation

Another implementation of the present invention is described in detail below in the context of managing the mobility of a mobile terminal 10 from an access network 4 including an autoconfiguration server 5, an access session server 7, and an application server 9.

The service considered manages handover taking into account local environment information obtained using the present invention.

In this example, the mobile terminal 10 is a WiFi™ telephone able to communicate using the IEEE 802.11 protocol. This telephone 10 is initially connected to a first wireless access point 30a associated with a first local network 20a and in range of two other neighboring wireless access points 30b, 30c. Each of the access points 30a, 30b, 30c defines a respective local network 20a, 20b, 20c defined by the radio range of the corresponding access point 30a, 30b, 30c.

The terminal 10 and the three access points 30a, 30b, 30c are able to communicate with the autoconfiguration server 5 and the application server 9 in accordance with the invention, as described above.

Figure 3:
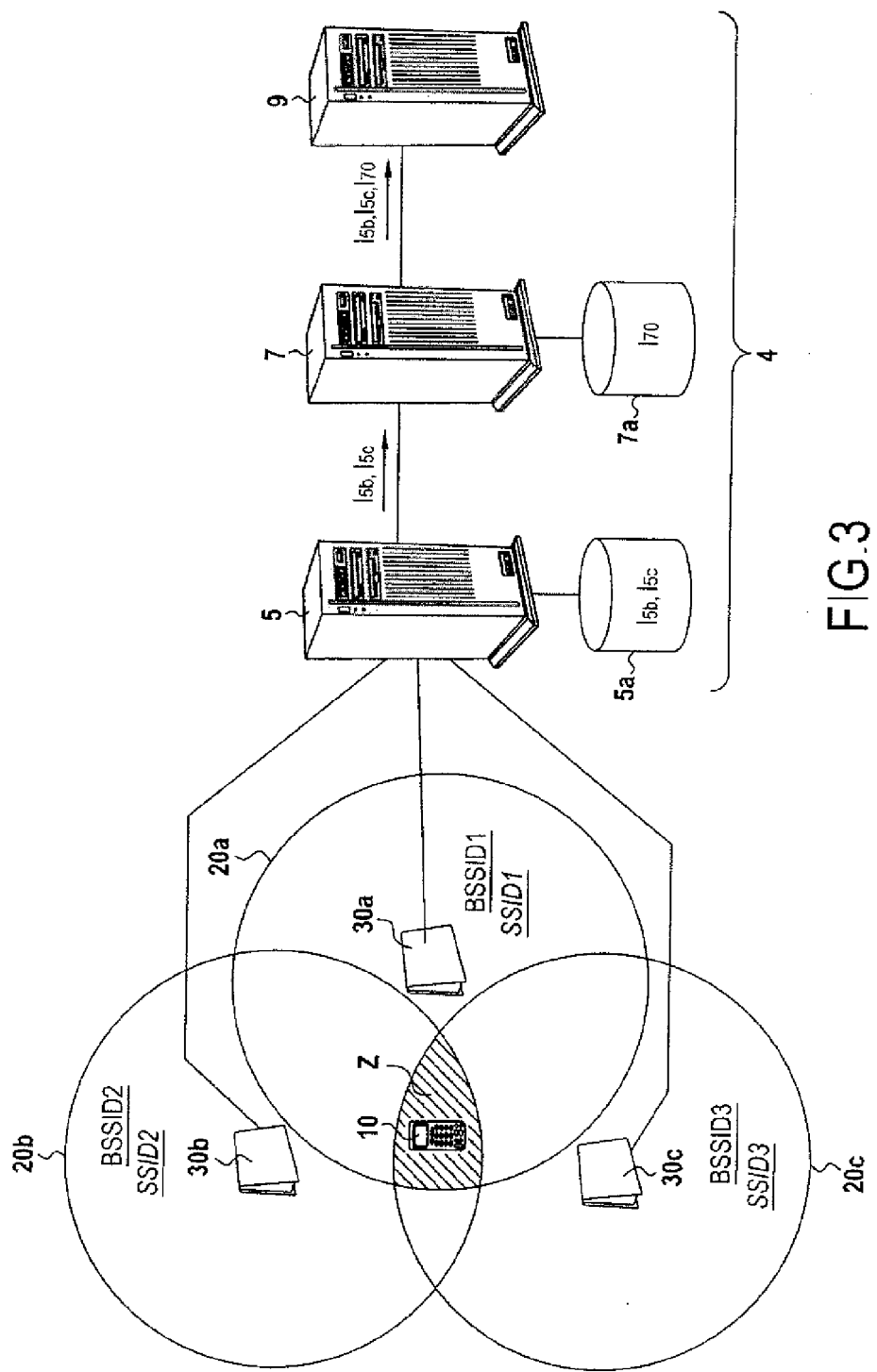
FIG. 3 shows diagrammatically a system of one particular embodiment of the present invention used in the context of managing the mobility of a terminal.

As shown in FIG. 3, at a given time the mobile terminal 10 is in an overlap area Z defined by the intersection of the coverage areas of the three local networks 20a, 20b, 20c.

Figure 4:
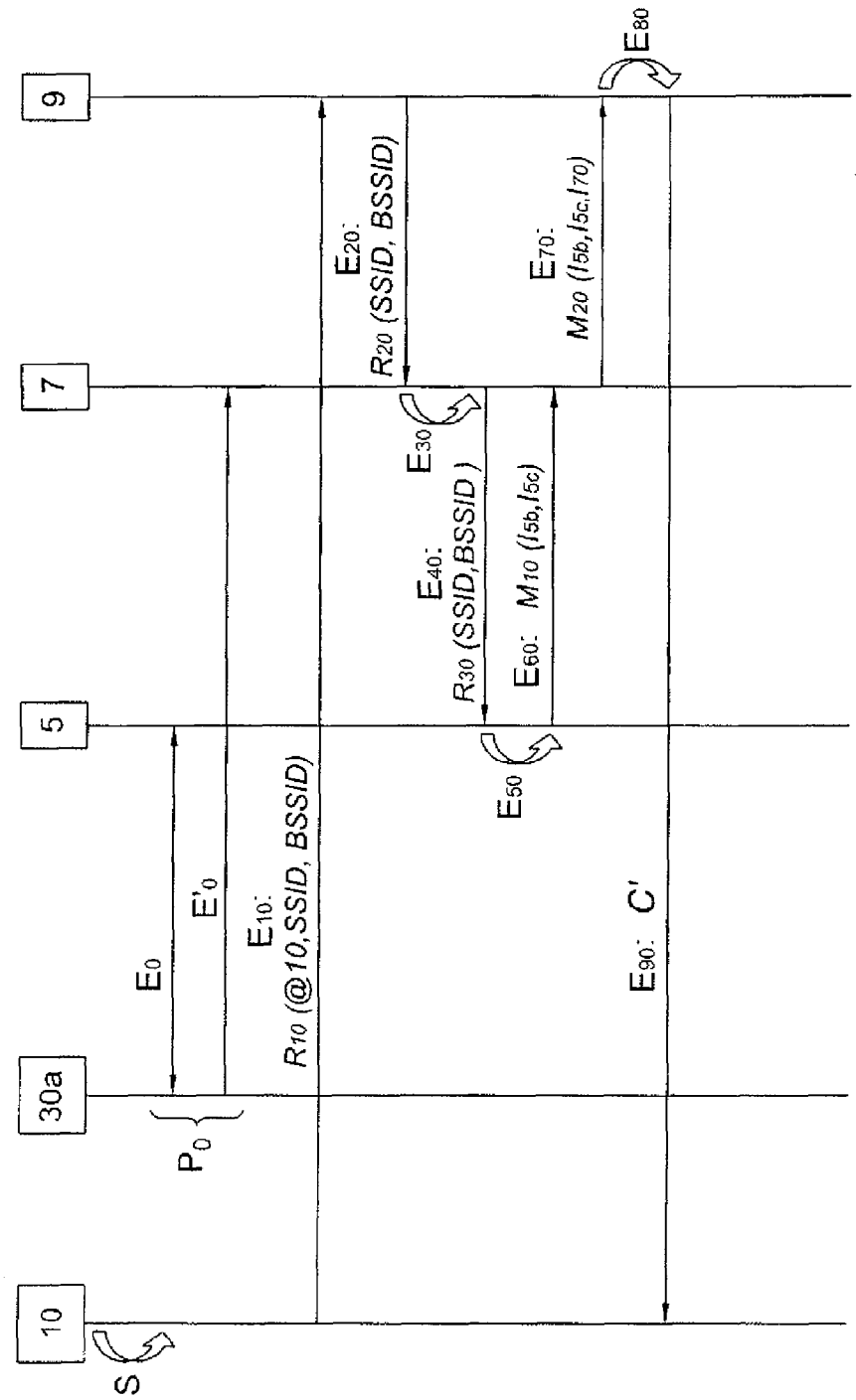
FIG. 4 shows in flowchart form the steps of the method of one particular implementation of the present invention used in the context of managing the mobility of a terminal.

The method of the invention is described in detail below with reference to FIG. 4 in the context of management of mobility or handover.

During a configuration phase $P_0$ as described above, each wireless access point 30a, 30b, 30c is configured by the autoconfiguration server 5 and identified by the access session server 7.

How the terminal 10 accesses the access network 4 is identified by the access session server 7 using in particular the public IP address (@10) of the terminal 10 or the public IP address (@30a) of the access point 30a.

During a sending step $E_{10}$ the terminal 10 sends the application server 9 a service request $R_{10}$ including:

the IP address (@10) identifying the mobile terminal 10;

an identifier SSID1 (SSID or ESSID: Extended Service Set Identifier) of the wireless access point 30a to which the terminal 10 is connected and the identifier BSSID1 (BSSID: Basic Service Set Identifier), this identifier consisting of the MAC (Medium Access Control) address of the access point 30a; and information relating to neighbor access points 30b, 30c within radio range of the mobile terminal 10, this information taking the form of a list of identifiers SSID (SSID2, SSID3) and identifiers BSSID (BSSID2, BSSID3). Each identifier BSSID corresponds to the MAC address of the associated access point.

The mobile terminal 10 obtains the identifiers SSID of the neighbor access points (SSID2, SSID3) during a preliminary scanning step S. Alternatively, the access point 30a that the terminal 10 initially uses is adapted to determine for itself the available neighbor access points 30b, 30c. The information relating to the neighbor access points 30b, 30c obtained in this way may advantageously be used during configuration of the access point 30a by the autoconfiguration server 5, for example to select a transmission channel that will not suffer interference from the neighbor access points. In this situation, the autoconfiguration server 5 may provide the identifiers of the neighbor access points directly to the application server 9, which avoids the terminal 10 having to effect a scan to detect the available access points.

In the FIG. 3 example, the terminal 10 in the local network 20a detects two neighbor access points 30b, 30c. Consequently, the terminal 10 provides in the service request $R_{10}$ its public IP address @10 and the information relating to the neighbor access points 30b, 30c, this information consisting of their respective identifiers SSID2, SSID3 associated with their respective MAC addresses BSSID2, BSSID3. If the access point 30a is a router modem, the address @30a of the access point to which the terminal 10 is connected is provided in the service request $R_{10}$.

On reception of the service request $R_{10}$, the application server 9 sends the session server 7 (step $E_{20}$) an information request $R_{20}$ including the list of identifiers {SSID, BSSID} of the neighbor access points 30b, 30c and the public IP address @10 used by the terminal 10 to connect to the access point 30a.

On reception of the information request $R_{20}$, the session server 7 verifies that the application server 9 is authorized to receive or recover information.

If so, the session server 7 obtains (step $E_{30}$) session information $I_7$ relating to the access session of the terminal 10 to the access network 4. This session information $I_7$ is extracted from the database 7a associated with the session server 7. Such information includes, for example, the geographical location of the home network 20a, the type of access and the radio access bit rate (uplink, downlink) used by the terminal 10.

Not knowing the identifiers {SSID, BSSID} contained in the information request $R_{20}$, the session server 7 transfers them to the autoconfiguration server 5 in a request $R_{30}$ (step $E_{40}$).

On reception of the request $R_{30}$, the autoconfiguration server 5 determines (step E50) from the identifiers (SSID2, BSSID2; SSID3 BSSID3) provided in this request $R_{30}$ the corresponding radio access environments (step $E_{50}$).

To this end, the autoconfiguration server 5 extracts from the database 5a local environment information $I_{5b}$, $I_{5c}$ relating to the radio connectivity available at the level of neighbor access points 30b, 30c for each access point 30b, 30c identified in the request $R_{30}$ (step $E_{50}$). This information relates to the configuration of the local network 20b, 20c of each access point 30b, 30c and more particularly the radio connection configuration parameters (protocol used: IEEE 802.11 a/b/g/n, authentication type (WEP) example, WEP key to use, channel to use, available bandwidth, number of terminals already connected).

In a different implementation, the autoconfiguration server 5 is adapted, on reception of the request $R_{30}$, to obtain the required local environment information $I_{5b}$, $I_{5c}$ directly from the access points 30b, 30c (this step is not shown).

The autoconfiguration server 5 may advantageously be adapted to select during this same step $E_{50}$ the pertinent local environment information $I_{5b}$ that relates only to the SSID of a subscription domain of the user that accepts roaming users. In particular, the autoconfiguration server 5 may be adapted to select an access point from the neighbor access points as a function of the adapted service (handover) to be provided to the terminal.

During a sending step $E_{60}$, the autoconfiguration server 5 sends the access session server 7 the pertinent local environment information $I_{5b}$ in a message $M_{10}$.

Note that selecting the pertinent local environment information at the level of the autoconfiguration server makes it possible to minimize the quantity of information sent to the session server 7 and thus to optimize the use of bandwidth in the access network 4.

On reception of the local environment information $I_{5b}$, $I_{5c}$ provided by the autoconfiguration server 5, the access session server 7 sends the application server 9 a message $M_{20}$ including the local environment information $I_{5b}$, $I_{5c}$ and the access session information $I_{70}$ (step $E_{70}$).

During a selection step $E_{80}$, the application server 9 selects from all the identified neighbor access points 30b, 30c that or those with local environment information $I_{5b}$, $I_{5c}$ compatible with the user's session information $I_{70}$. The application server 9 selects an access point 20b able to provide for roaming or handover of the terminal 10 when it is preparing to exit the coverage space of the local network 20a to which it is initially connected.

To this end, the application server 9 eliminates the access points that are not able to support service connection requests activated on the terminal of the user 10, verifying their network connectivity and verifying that the customers of the access points accept roaming users, the access points are connected to the access network 4, the bandwidth necessary to continue the service is not available, the bit rate available at the access points identified by the identifiers SSID, the bit rate available in the access network 4 as far as each point.

In summary, from the identifiers SSID of the access points within radio range of the terminal 10, the application server 9 situated in the access network 4 obtains WAN and LAN environment information from these points. As a function of these two types of information, the application server 9 is able to manage handover in the event of mobility of the terminal 10.

The autoconfiguration server 5 of the invention has the standard architecture of a computer. As shown in FIG. 3, it includes in particular a processor 50, a random-access memory (RAM) 52, and a read-only memory (ROM) 53.

The read-only memory 53 constitutes a storage medium 53 of the invention storing a computer program $P_1$ of the invention. This program $P_1$ includes instructions for executing steps $E_5$, $E_{50}$ of extracting and $E_6$, $E_{60}$ of sending local environment information $I_5$, $I_{5b}$, $I_{5c}$ of the method of the invention, these steps being described above with reference to FIGS. 2 and 4. The processor 51 uses the random-access memory 52 to execute the computer program $P_1$ of the invention.

The autoconfiguration server 5 also includes communications means 54 able to communicate firstly with the home gateway 3, the wireless access points 20a, 20b, 20c, the terminals 1a, 10 and secondly with the session server 7.

The session server 7 of the invention has the standard architecture of a computer. As shown in FIG. 3, it includes in particular a processor 70, a random-access memory (RAM) 72, and a read-only memory (ROM) 73.

The read-only memory 73 constitutes a storage medium 73 of the invention storing a computer program $P_2$ of the invention. This program $P_2$ includes instructions for executing the interrogation steps $E_4$, $E_{40}$ for obtaining the local environment information $I_5$, $I_{5b}$, $I_{5c}$ from the autoconfiguration server 5, the steps $E_3$, $E_{30}$ of obtaining session information, and the steps $E_7$, $E_{70}$ of sending this information to the application server 9 of the method of the invention described above with reference to FIGS. 2 and 4. The processor 71 uses the random-access memory 72 to execute the computer program $P_2$ of the invention.

The session server 7 also includes communications means 74 able to communicate firstly with the autoconfiguration server 5 and secondly with the application server 9.

The application server 9 of the invention has the standard architecture of a computer. As shown in FIG. 3, it includes in particular a processor 90, a random-access memory (RAM) 92, and a read-only memory (ROM) 93.

The read-only memory 93 constitutes a storage medium 93 of the invention storing a computer program $P_3$ of the invention. This program $P_3$ includes instructions for executing the steps $E_2$, $E_{20}$ of sending and the steps $E_7$, $E_{70}$ of receiving local environment information $I_5$, $I_{5b}$, $I_{5c}$ and session information $I_7$, $I_{70}$, and the adaptation steps $E_8$, $E_{80}$ and sending steps $E_9$, $E_{90}$ as described above with reference to FIGS. 2 and 4. The processor 91 uses the random-access memory 92 to execute the computer program $P_3$ of the invention.

The application server 9 also includes communications means 94 able to communicate firstly with the terminals 1a, 10 and secondly with the session server 7.

The invention claimed is:

1. A method used by an access session server to obtain information relating to a terminal of a local network, said access session server being adapted to provide information relating to an access session of the terminal to an access network;
   wherein the information obtaining method comprises, on reception of an information request relating to a terminal belonging to a local network comprising at least the terminal and a device for access to the access network originating from an application server:
   sending an interrogation request including an identifier of the access device of said local network to an auto-configuration server said autoconfiguration server being adapted to configure at least one item of equipment of said local network;
   in response to said interrogation request, receiving a message from the auto-configuration server, said message including information relating to a local environment of said terminal, said information relating to a local environment of said terminal comprising configuration parameters for at least one item of equipment of said local network, and
   providing said information relating to a local environment to the application server.

2. The method according to claim 1, further comprising sending by the access session server to the application server of information relating to an access session of the terminal and information relating to a local environment of the terminal.

3. A method used by an autoconfiguration server, the autoconfiguration server being adapted to configure at least one item of equipment of a local network comprising at least a terminal and a device for access to the access network, the method comprising:
   receiving by said auto-configuration server of an interrogation request including an identifier of the access device of said local network, originating from an access session server, to obtain information selected from information relating to a local environment of the terminal, said information relating to a local environment of said terminal comprising the configuration parameters for at least one item of equipment of said local network;
   selecting by said auto-configuration server of the information relating to a local environment of the terminal to be provided to the access session server as a function of a service to be provided to the terminal by an application server; and
   providing by said auto-configuration server of said selected information to said access session server, in response to said request.

4. The method according to claim 3, wherein the information relating to a local environment of the terminal comprises information relating to facilities for access to the access network which neighbor the terminal and wherein the method comprises selecting an access facility from among said access facilities as a function of the service to be provided by the application server.

5. A method of providing service to a terminal of a local network, the method comprising:
   sending of a request for information relating to a terminal belonging to a local network comprising at least the terminal and a device for access to an access network by an application server to an access session server of the access network;
   obtaining and providing by said access session server to said application server of information relating to an access session of the terminal to an access network;
   obtaining and providing of information selected from information relating to a local environment of the terminal to said application server by said access session server in accordance with a method according to claim 1, said information being selected by an auto-configuration server as a function of a service to be provided to the terminal; and
   providing by said application server to said terminal of at least one suitable service as a function at one and the same time of the information relating to an access session of the terminal and of said selected information.

6. The method according to claim 5, wherein the information relating to a local environment of the terminal comprises information relating to facilities for access to the access network which neighbor the terminal and wherein the method comprises selecting an access facility from among said access facilities as a function of the suitable service to be provided.

7. An access session server for providing information relating to an access session to an access network of a terminal, such that the access session server is configured to, on receipt of a request for information relating to a terminal belonging to a local network comprising at least the terminal and a device for access to the access network originating from an application server:
   send an interrogation request including an identifier of the access device of said local network to an auto-configuration server to configure at least one item of equipment of said local network,
   in response to said interrogation request receive a message from the auto-configuration server, the message including information relating to a local environment of the terminal, said information relating to a local environment of said terminal comprising configuration parameters for at least one item of equipment of said local network, and
   provide this information relating to a local environment to said application server.

8. An autoconfiguration server adapted to configure at least one item of equipment of a local network comprising at least one terminal and a device for access to an access network, the auto-configuration server being configured to:
   obtain information relating to a local environment of the terminal, receive an interrogation request including an identifier of the access device of said local network, originating from an access session server, so as to obtain information selected from information relating to a local environment of the terminal, said information relating to a local environment of said terminal comprising configuration parameters for at least one item of equipment of said local network;

select information relating to a local environment of the terminal to be provided to the access session server as a function of a service to be provided to the terminal by an application server; and provide the selected information to said access session server, in response to said interrogation request.

9. A non-transitory compute-readable medium including instructions for executing the steps of the method according to claim 3 when said is instructions are executed by a computer.

10. A non-transitory computer-readable medium including instructions for executing the steps of the method according to claim 1 when said instructions are executed by a computer.

11. A system comprising:

a terminal of a local network;

said system also comprising an auto-configuration server adapted to configure at least one item of equipment of a local network comprising at least one terminal and a device for access to an access network, the auto-configuration server being configured to:

obtain information relating to a local environment of the terminal, receive an interrogation request including an identifier of the access device of said local network, originating from an access session server, so as to obtain information selected from information relating to a local environment of the terminal, said information relating to a local environment of said terminal comprising configuration parameters for at least one item of equipment of said local network;

select information relating to a local environment of the terminal to be provided to the access session server as a function of a service to be provided to the terminal by an application server; and provide the selected information to said access session server, in response to said interrogation request;

said system also comprising an access session server for providing information relating to an access session to an access network of a terminal, such that the access session server is configured to:

on receipt of a request for information relating to a terminal belonging to a local network comprising at least the terminal and a device for access to the access network originating from an application server, send an interrogation request including an identifier of the access device of said local network to an auto-configuration server to configure at least one item of equipment of said local network;

in response to said interrogation request, receive a message from the auto-configuration server, the message including information relating to a local environment of the terminal, said information relating to a local environment of said terminal comprising configuration parameters for at least one item of equipment of said local network; and provide said information relating to a local environment to said application server said system also comprising an application server to provide services to said terminal, said application server being configured to:

send a request for information relating to the terminal to said access session server; and provide said terminal with at least one suitable service as a function of information relating to an access session of the terminal obtained from the access session server and of information relating to a local environment of the terminal, also obtained from the access session server.

* * * * *

UNITED STATES PATENT AND TRADEMARK OFFICE
CERTIFICATE OF CORRECTION

PATENT NO. : 8,516,109 B2
APPLICATION NO. : 13/056514
DATED : August 20, 2013
INVENTOR(S) : Radier et al.

Page 1 of 1

It is certified that error appears in the above-identified patent and that said Letters Patent is hereby corrected as shown below:

In the Specification

In column 6 at line 50, Change "DeviceQperationMode;" to --DeviceOperationMode;--.

In column 11 at line 67, Change "makes" to --5 makes--.

In the Claims

In column 15 at line 7, In Claim 9, Change "compute-readable" to --computer readable--.

In column 15 at line 9, In Claim 9, Change "said is" to --said--.

Signed and Sealed this
Twentieth Day of May, 2014

Michelle K. Lee
*Deputy Director of the United States Patent and Trademark Office*